Figure 1:
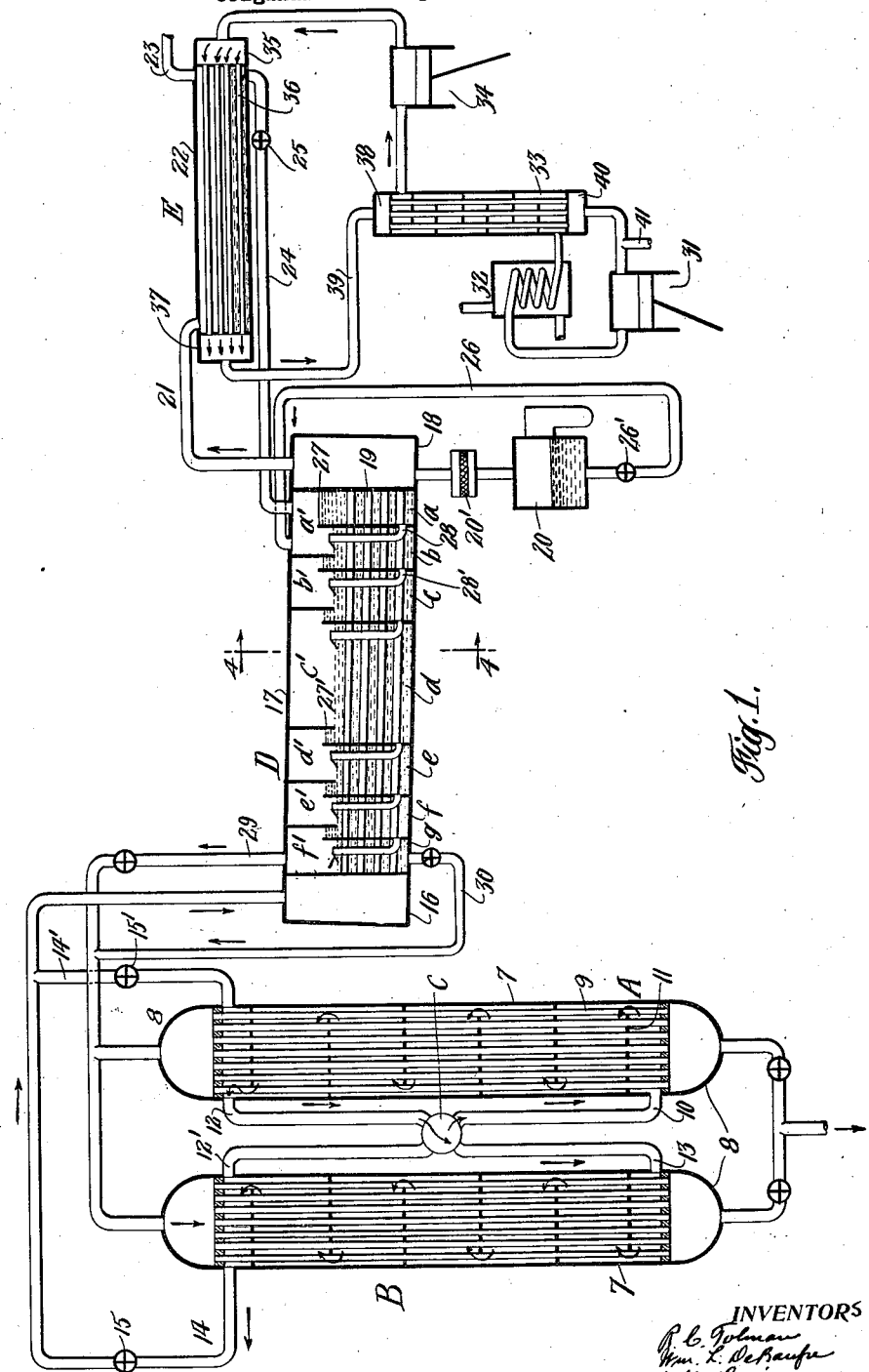

July 3, 1928.

R. C. TOLMAN ET AL 1,676,225

LIQUEFACTION APPARATUS

Original Filed Sept. 16, 1922  3 Sheets-Sheet 1

WITNESS
Gustav Genzlinger

INVENTORS
R. C. Tolman
Wm. L. DeBaufre
J. W. Davis
M. N. Roberts
BY
Synnestvedt & Lechner
ATTORNEYS

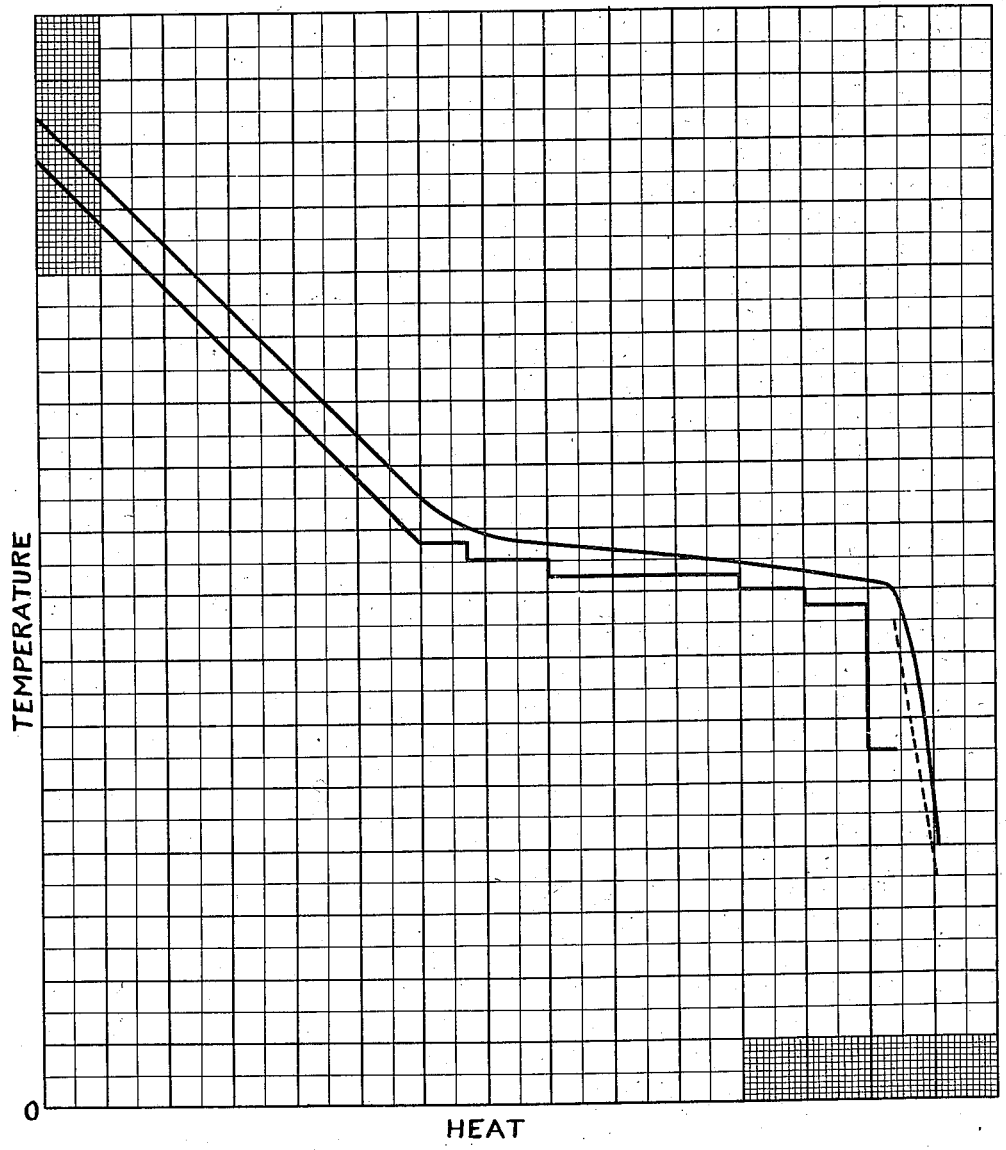

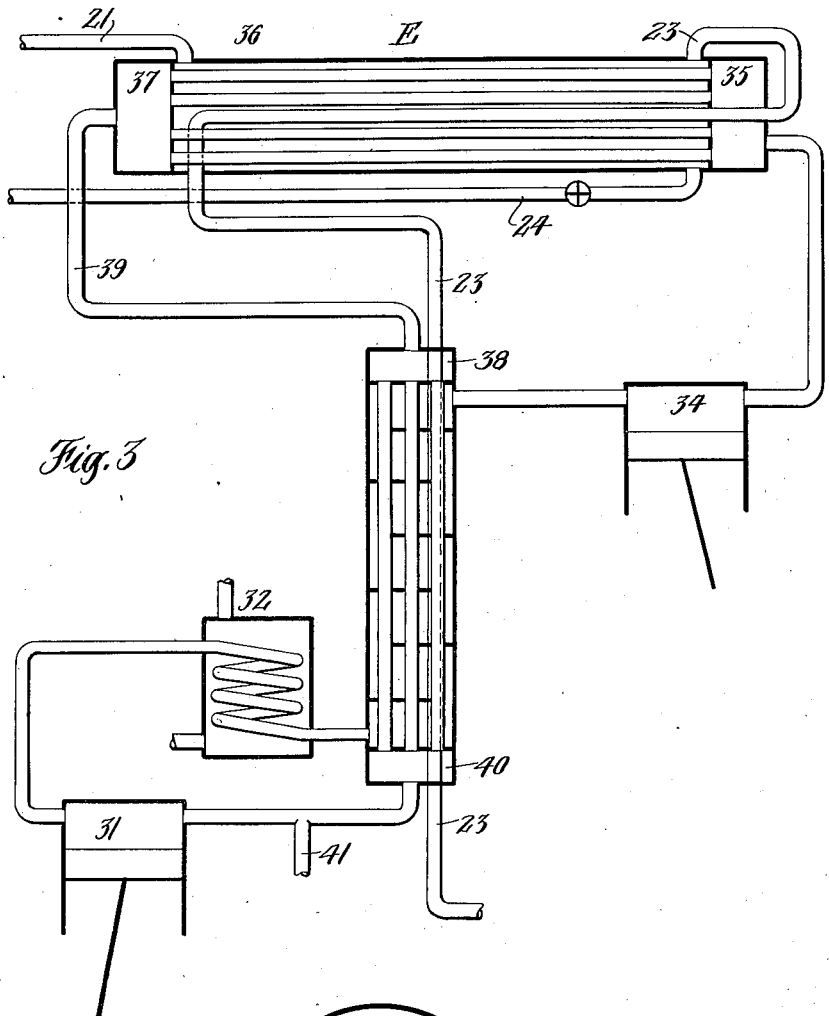
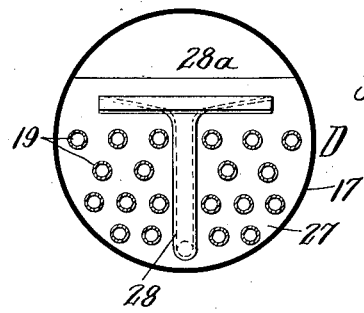

Patented July 3, 1928.

1,676,225

UNITED STATES PATENT OFFICE.

RICHARD C. TOLMAN, OF WASHINGTON, DISTRICT OF COLUMBIA; WILLIAM L. DE BAUFRE, OF LINCOLN, NEBRASKA; JOHN W. DAVIS, OF WASHINGTON, DISTRICT OF COLUMBIA; AND MONTAGUE H. ROBERTS, OF ENGLEWOOD, NEW JERSEY, ASSIGNORS TO SAMUEL G. ALLEN, TRUSTEE.

LIQUEFACTION APPARATUS.

Original application filed September 16, 1922, Serial No. 588,530. Divided and this application filed December 29, 1923. Serial No. 683,276.

This invention relates to improvements in the art of separation of various constituents of air, natural and other gases; and it is especially useful where the substance (or substances) to be separated is volatile and has a low boiling point relative to the boiling points of the other constituents of the particular gaseous mixture and is not highly soluble in their liquids. Helium, which is found in the natural gases in the Petrolia field in Texas, is such a substance and since the invention is particularly useful in the production of helium, the separation of this substance will be described as illustrative of our process.

Heretofore, in the separation of such substances as helium, the liquefaction processes employed in standard air separation methods have been followed, but such processes, while measurably successful for such purpose, have not proven to be successful in the separation of helium, the cost of separating a useful quality of helium being prohibitive. In the air separation processes, no one of the main products has been comparatively low in boiling point relative to the other chief constituents. In applying these processes to the separation of helium, the nitrogen of the gaseous mixture has been liquefied and separated from the other substances so that the liquid nitrogen could be used for cooling purposes, the liquefied substances being repeatedly drawn away for this purpose as liquefaction took place. When this is done in the separation of helium, which constitutes but a small percentage of the gas and which, as stated, has a very low boiling point relative to the other substances and is not very soluble in their liquids, the thermo-dynamic efficiency is so low as to make the cost of production prohibitive. (Helium has a boiling point of approximately 4° C. absolute and nitrogen, which is the nearest to it, has a boiling point of approximately 79° C. absolute.)

In the air separation processes, most effective separation may be obtained by rectification at low pressure, but where rectification is not desirable, as we have found when helium, for example, is to be separated, it is preferable to use relatively high pressures (in the neighborhood of 30 atmospheres) throughout the cycle, as the vapor pressure of the less volatile constituents will then be a smaller fraction of the total pressure during liquefaction.

There are also other respects in which the standard liquefaction processes are objectionable and certain of these will appear in the following description:

It is the aim and object of our invention to overcome the difficulties mentioned; and also to provide apparatus by virtue of which helium and other comparable substances may be separated economically and in a purer state.

We accomplish the foregoing, together with such other objects as may hereinafter appear, or are incident to our invention, by means of a method which we have diagrammatically illustrated in the accompanying drawings, wherein:

Fig. 1 is a diagrammatic view of apparatus suitable for carrying out our invention; Fig. 2 is a curve illustrating the cycle and the principles of our invention; Fig. 3 illustrates a modification of the invention; and Fig. 4 is a section taken on the line 4—4 of Fig. 1.

Before passing to a detailed description of the method and apparatus which we employ, certain of the general principles upon which the invention proceeds will be briefly summarized as follows:

For a gas of given constituency or composition, if phase equilibrium is maintained between the vapor and the condensate and no liquid is removed, then under constant pressure a given temperature must be reached in order to liquefy the same or to liquefy a given proportion of the substances which it is desired to remove by liquefaction. If as liquefaction proceeds, liquid is abstracted, the composition of the remaining gas or the remaining mixture of liquid and gas is altered and a still lower temperature must be obtained in order to liquefy the remaining gas or to liquefy the substances which are not desired. This latter is what has heretofore been done with the result that the liquefaction curve, instead of being flat or substantially horizontal, is sharply inclined, the progressive removal of the liquid or condensate necessarily involving a progressive lowering of the temperature which had to be obtained in order to carry on the liquefaction process. This makes the approximation of the reversible cycle impractical and, therefore, involves the use of much more power than we have found actually necessary. By our process we propose to produce a substantially flat liquefaction curve as we do not abstract the liquid or take it away from the gases until liquefaction is practically complete, and during liquefaction we maintain, as nearly as possible, phase equilibrium between the vapor and the liquid.

The foregoing may be stated in another way. In cooling the incoming gas in the interchanger to approximately the dew point, there must necessarily be a large drop in temperature and also the abstraction of a considerable quantity of heat. The liquefaction of the gases, however, from approximately the dew point until the final or purification stage, may be obtained with the abstraction of a large quantity of heat but by means of a relatively small drop in temperature, providing that the composition of the mixture is not altered during liquefaction. This has apparently not been heretofore realized and is, among other things, what we accomplish by our process.

It has been realized by others before that a truly reversible cycle would be thermodynamically the most efficient but such a cycle, in so far as we are aware, has not heretofore been approximated. We have discovered that to obtain such a cycle, the incoming fluid should be liquefied by boiling or evaporating a returning fluid of substantially the same composition. If the return fluid be of different composition, then there is an unnecessary increase in entropy and a consequent increase in power uselessly expended. Heretofore, in this art, it has been assumed that the increase in entropy was largely attributable to heat leaks in the system, but we have found that this is a negligible factor and that one of the primary causes of the increase in entropy is that the incoming fluid has been liquefied by evaporating a return fluid of materially different composition. In accordance with our process, we propose to subject the incoming fluid to a return fluid of substantially the same composition, save with respect to the element which is to be separated out, and we thus obtain as truly a reversible cycle as it is possible to obtain.

The reasons which make it desirable to keep the vapor and liquid of the incoming fluid in contact with one another during liquefaction, apply also to the return fluid evaporated by means of the incoming fluid. This return fluid should be evaporated in such manner that the vapor formed is kept in contact with the liquid and equilibrium maintained as nearly as possible for the reason that thereby a minimum increase only in temperature is required for evaporation which, of course, involves a minimum power consumption. Stated in other words, a given increase in temperature is required to evaporate a liquid of a certain composition, providing that the composition of the mixture remains the same and neither vapor nor liquid is drawn off or removed and substantial phase equilibrium is maintained. If the composition of the mixture be altered then there will be an increase in the temperature required to effect evaporation.

If a minimum expenditure of power and a high degree of efficiency are to be obtained, the pressure drop between the incoming and the returning streams of fluid should be kept low and we prefer the minimum drop required to produce the difference in temperature necessary to secure the heat transfer through the metal parts and to maintain a flow through the system; whereas heretofore it has been the practice to have a very large drop in pressure in certain parts of the cycle, often as high as 200 to 1 (and never materially below 30 to 1) which, of course, involves the useless expenditure of a large amount of power.

We have also found that the purity of product, for any attainable temperature, is increased if the separation be effected at high pressure, say for example, in the neighborhood of 30 atmospheres which should obtain through the cycle with substantial constancy. Heretofore it has not been the practice to maintain a high substantially constant pressure but on the contrary in the various steps of cooling, liquefying and rectifying up till purification, the pressure has been widely dropped, involving power losses due to thermo-dynamic inefficiency.

We have also found that the solubility of the substance to be separated, in the liquids of the condensed portions of the gas, has an important bearing on the yield or recovery; and with such substances as helium, although they are relatively not thus soluble, their solubility in the liquids increases with drop in temperature. In any process, therefore, in which the liquefaction is accomplished with a large drop in temperature in the liquefier, the losses in yield will be greatly increased. We propose to overcome this difficulty by reason of the fact that we secure liquefaction with the minimum drop in temperature in the liquefier; and in addition we propose to remove the liquid condensed before purification so as not only to obtain maximum yield, but also avoid expenditure of power in uselessly cooling a large body of liquid.

How we put the foregoing and other principles into effect and obtain the advantages herein set forth, will now be described.

In some respects the first step of our process is similar to old processes, in that we pass the gas through an interchanger. However, we may introduce raw gas into the interchanger without the preliminary purification heretofore employed. Other differences will appear as the process is described.

In the drawings we have shown an interchanger having two units A and B, each unit comprising a casing 7, a pair of headers 8 and the tubes 9 extending within the casing 7 and connecting the two headers. The gas is admitted through the valve—indicated as a whole by the referrence letter C—preferably at a pressure of approximately 30 atmosphres and at a temperature of approximately 35° C. and passes via the pipe 10 into the casing 7 of the unit A, flowing from one end to the other in a tortuous path about the tubes 9, as indicated by arrows, the interior of the casing 7 being provided with a plurality of baffles 11 for this purpose. (With reference to the pressure and temperatures given in this specification, attention is directed to the fact that these are illustrative merely and are what we have found to be preferable in the separation of helium from the particular gas mentioned, and that for other mixtures and for the separation of other substances different pressures and temperatures may be required, as the exigencies of the particular case demand). In passing through the unit A, the gases are somewhat cooled by thawing out the frozen water vapor in the unit, and they leave the unit A by way of the pipe 12, crossing over at the valve to the pipe 13 leading to the bottom of the unit B, where the gas is cooled by the return substances going through the tubes 9. A pipe 12', corresponding to the pipe 12, is connected with the casing of the unit B so that the interchanger units may be reversed. The cooled gases pass out of the upper end of the unit B through the pipe 14, which is provided with a suitable shut-off valve 15 and which leads to the heater 16 of the liquefier, indicated as a whole by the reference letter D. The gas enters the header 16 approximately at a pressure of 30 atmospheres and a temperature of approximately minus 100° C. which is practically the dew point. An outlet pipe 14' leads from the upper end of the casing 7 of the unit A and is connected to the pipe 14 and is controlled by a shut-off valve 15', such valve being closed when the flow is first through the unit A and then through the unit B, as described, the valve 15 being closed and the valve 15' being open when the flow takes place through the unit B and then through the unit A.

The first portion of the curve of Fig. 2 illustrates the drop in temperature and the amount of heat abstracted in cooling the gas to approximately the dew point. It will be observed that there is a large drop in temperature and a considerable quantity of heat abstracted.

The liquefier D comprises the casing 17, the header 16 previously mentioned, the header 18, and the tubes 19 connecting the headers 16 and 18. This liquefier is preferably substantially horizontally disposed, with a slight inclination from the horizontal. The reason for inclining the liquefier is to cause the liquid condensing in the tubes 19 to flow as rapidly through such tubes as the gas or vapor above the liquid is being conducted through the tubes by the pressure drop; and this together with the general horizontal disposition of the liquefier enables us to more easily keep the incoming vapor and liquid in substantial phase equilibrium. Thus the gases entering the header 16 at approximately the dew point are subjected to the action of the returning fluid as they pass through the pipes 19, and practically all of the readily liquefiable contents of the gas are liquefied, the liquid and gas passing along together, in intimate contact with each other and in substantial phase equilibrium, the composition of the mixture being approximately uniform through the length of the tubes 19, with a minimum variation in the composition of the vapor above the liquid. The condensate leaving the pipes 19 passes down into the chamber 20 connected with the header 18 through a filter 20', and the uncondensed vapors pass out of the header 18 approximately at a pressure of 30 atmospheres and a temperature somewhat lower than the dew point mentioned, say for example, minus 117° C., by way of the pipe 21 to the purifier, indicated as a whole by the reference letter E.

In this manner we are enabled to produce the flat liquefaction curve shown in Fig. 2—the same being the horizontal portion of the curve. From inspection of this curve it will be seen that we are enabled to abstract the large amount of heat necessary to liquefy substantially all substances save the helium and the remaining impurities in the helium, with a minimum drop in temperature, thereby securing the greatest possible degree of efficiency with a minimum expenditure of power. If liquid had been abstracted as condensation took place, this portion of the curve would drop off very sharply because of the lower temperatures which would have to be attained in order to accomplish liquefaction. It will also be observed that the curve is substantially flat until complete liquefaction is approached, when it begins to drop off, which means that we are enabled to accomplish the liquefaction before there is material loss in yield by virtue of the solubility of the helium in the liquid condensed, which, as before pointed out, increases with drop in temperature. By not removing the condensed nitrogen and methane during liquefaction, we additionally obtain the advantage of high purity of product at comparatively high temperature and with high thermo-dynamic efficiency.

The gas entering the purifier E is an impure helium, the impurities being a small quantity of nitrogen and methane and traces of other constituents. The gas is subjected to the cooling action of an external cycle of refrigeration and the impurities referred to above are liquefied, collecting in the bottom of the horizontal casing 22 of the purifier, practically pure helium being drawn off by pipe 23 at a pressure of approximately 30 atmospheres and a temperature of approximately minus 170° C. The liquid condensed in the purifier is returned to the liquefier by means of the pipe 24 provided with a throttling valve 25 which throttles the pressure down to preferably 20 atmospheres.

The liquid condensed in the tubes of the liquefier D is returned to the shell of the liquefier through the pipe 26 at a pressure of approximately 20 atmospheres obtained by means of a throttling valve 26' and at a temperature of approximately minus 121° C.

The external cycle of refrigeration referred to will be hereinafter described.

The lower portion of the casing 17 of the liquefier is divided into compartments by means of division walls 27, forming the compartments $a$, $b$, $c$, etc., in the lower portion of the liquefier casing. The space above the liquid in the casing is also divided into compartments $a'$, $b'$, $c'$, etc., by hanging baffles or deflection plates 27'. From the bottom of each lower compartment a pipe 28, 28', etc., leads to the upper region of the next lower compartment. The return liquid is delivered by pipe 24 to the compartment $a$ and by the pipe 26 to the compartment $b$. From compartment $a$ the liquid not evaporated flows through pipe 28 to compartment $b$; and from such compartment, the unevaporated liquid flows into compartment $c$ by means of pipe 28'; and so on from compartment to compartment. Since the pressure of the vapor above compartment $a$ is the same as the vapor pressure above the mouth of pipe 28, liquid accumulates in compartment $a$ until there is sufficient head to cause liquid to flow out of pipe 28 into compartment $b$, the liquid being discharged into the vapor in the upper compartment $a''$. This is true of the other compartments. The arangement of baffling is, therefore, one tending to keep the liquid and vapor in intimate contact or relation and to maintain phase equilibrium; this purpose being furthered by providing a broad lip or plate 28$^a$ at the orifice of the pipes 28, 28', etc, over which the discharging liquid flows in a thin, wide sheet-like stream ensuring subjection of the liquid to the vapor. The vapor evaporated, also, cannot take a free course directly to the outlet 29 of the liquefier but must bubble through the liquid in passing progressively under the baffles 27' from compartment to compartment.

Thus a minumum rise in temperature is required to effect the evaporation necessary to secure the required heat transfer, which means that maximum efficiency is obtained with minimum power expenditure.

Furthermore, the arrangement is one tending to secure the most effective application of the return fluids to the down-coming fluids for the reason that the liquids containing the more readily volatilizable substances are applied to those portions of the tubes carrying the relatively harder vapors to liquefy, that is to say, a true counterflow is closely approximated, with vapor and liquid in intimate contact and in substantial phase equilibrium.

The gases returning from the casing 17 to the outlet pipe 29 are delivered to the headers 8 and pass through the tubes 9 of the interchanger securing the necessary heat transfer in the interchanger, the gas leaving the casing 17 at approximately a pressure of 20 atmospheres and a temperature of minus 111° C. and leaving the interchanger at substantially 20 atmospheres pressure and a temperature of plus 17° C. It will, of course, be understood that when the flow of the incoming gas is first through the unit A of the interchanger, the gas from the liquefier is conducted through the tubes of the unit B, cooling the gases coming into such unit from the unit A, as before described; and when the flow of incoming gas is first through unit B and then through unit A, the gases from the liquefier are led through unit A to cool the gases coming thereinto from unit B. To this end the outlet pipes leading from the bottom headers of the unit are provided with valves.

Depending upon how closely equilibrium is attained, the last compartment of the liquefier as we have arranged it, may contain a liquid (such for example, as ethane) which has a relatively high boiling point, that is to say, is of low volatility; and if provision were not made for the abstraction of such liquid from this compartment, the liquefier would eventually fill with high boiling point liquid and its operation would be greatly impaired, if not destroyed. To meet this condition we take a lead 30 from the bottom of the last compartment and connect it to the return pipe 29 so that any relatively high boiling point liquid which may be present in the liquefier shall be returned along with the gases leaving the upper regions of the liquefier casing to the interchanger where, of course, such liquid will be evaporated and effective heat transfer secured in the interchanger.

If it were possible to obtain an absolutely true reversible cycle, the return curve, or rather the curve of the returning fluid under the down-coming fluid, would coincide with the liquefaction curve; but since it is impossible to obtain an absolutely reversible cycle, on account of the necessity for a temperature difference in obtaining the heat transfer and other items incident to operation, in a cycle as truly reversible as it is possible to obtain, the curve of the returning fluid in the liquefier and also in the interchanger should approximately parallel the curve of the incoming fluid in the interchanger and liquefier. The return curve produced by our process approximately parallels the down-coming curve with the minimum drop in temperature between the two streams necessary to secure the requisite heat transfer. This will be seen on inspection of Fig. 2, the stepped portion of the return curve showing the curve of the liquid evaporated and heated on the liquefier. The steps of this portion of the curve are produced by the various compartments of the liquefier, the steps being closer together, i. e. smaller, adjacent those portions of the down-coming curve which are rounded, because at such portions conditions change more rapidly. Thus, in the tubes at the right-hand end of the liquefier, the remaining vapors are rapidly becoming more difficult to liquefy, and, therefore, theoretically, the right-hand end of the liquefier casing should be split up into a number of small compartments so as to apply correspondingly more easily volatilizable substances in true counter-flow. To this end we have progressively diminished the size of the compartments at the right-hand end of the liquefier. Similarly, just below the dew point, for a short interval, the gas becomes rapidly more easily liquefiable, to meet which condition the compartments at the left-hand end of the liquefier D are also made smaller. The essentially flat portion of the liquefaction curve shows that for an interval there is a greater degree of constancy in conditions, and during this interval, the compartment or compartments of the liquefier casing may be of larger dimension. The return curve illustrating the evaporation of the return fluids thus has substantially the same flat characteristic as the liquefaction curve. It will, of course, be understood that the number and size of the compartments will vary with the particular mixture of gas and the substance separated.

Referring now to the cycle of refrigeration by means of which the helium is purified in the purifier E by the liquefaction of the impurities, this is, as stated, an external cycle, whereas the refrigeration in the process up to this point is accomplished primarily by means of an internal cycle. Any suitable form of refrigeration may be employed for the purifier, but we prefer apparatus such as diagrammatically indicated, preferably using an inert gas which does not condense easily. We mention nitrogen or helium as a suitable medium for this purpose. This is drawn into the system and its pressure is raised to approximately 30 atmospheres by the compressor 31, the gases being cooled to a temperature of about plus 35° C. in the after-cooler 32, from whence it is conducted to the interchanger 33 in which the gases are cooled to a temperature of approximately minus 104° C. The gases leaving the interchanger are then expanded by means of the expansion engine 34 to approximately one (1) atmosphere of pressure and thereby cooled to a temperature of approximately minus 180° C., the expanded gases being led to the purifier at the header 35, passing therefrom through the tubes 36 to the header 37 and from thence to the header 38 of the interchanger by means of the pipe 39. The gases enter the header 38 at a temperature of approximately minus 123° C. and serve to cool the incoming gas. The gases leave the outlet header 40 of the interchanger at approximately plus 30° C. and are returned to the inlet side of the compressor. The cycle is thus, in effect, a substantially closed one and any "make up" necessary is supplied to the low pressure side of the compressor at the point marked 41.

By our apparatus, the purification of the helium can be obtained without dropping the pressure and with the abstraction of very little heat notwithstanding the very large drop in temperature required and thus with a minimum of power consumption. By removing the liquid from the vapor at the end of the liquefier, no power is uselessly expended in cooling a large body of liquid and thus the size and power consumption of the external cycle are reduced to a minimum. The use of a gas which is not condensed at the lowest temperature obtained gives economy in power in the external cycle and an inert gas maintains safety.

If desired, the helium discharging from the purifier at the pipe 23 may be passed through the purifier casing, and thereafter through the interchanger 33, thus permitting of its use for cooling purposes. Such an arrangement we have illustrated in Fig. 4 of the drawings.

The reason for placing the helium purifier in combination with the auxiliary refrigerating system in a substantially horizontal position is the desire to keep the liquid and gas in contact as far as possible in order to approximate equilibrium between all of the gas and the liquid, rather than between the gas and the last portion to be condensed out, thus obtaining a higher purity of helium.

The last portion of the curve of Fig. 2 shows the purification by external refrigeration, illustrating the temperature drop and the heat abstracted. It will be seen that the purification is accomplished with the abstraction of relatively little heat and by a large temperature drop.

The progressive evaporation of the returning liquid provides for the elimination of high boiling point substances such as ethane and the higher hydro-carbons, as it ensures their collection in the warm end of the liquefier where they can be returned to the interchanger without disorganizing or impairing the functioning of the system, particularly the liquefaction step thereof. This also obtains maximum efficiency in the interchangers. The evaporation of the liquid in steps and the return of the liquid and gas together also makes possible the condensation of the gas by evaporation of mixed liquids with a minimum pressure drop in the system.

It will also be seen that we have provided a system in which the cooling and then the liquefaction, generally considered, are obtained by an internal cycle which is approximately reversible and requires only that minimum expenditure of power necessary as the result of natural losses such as the losses in obtaining actual heat transfer, heat leaks and the like, and in which the additional power expended is reduced to a minimum because it is applied at a point where it is most effective and where it will not interfere with nor disorganize the other steps of the process. Heretofore, it has been the customary practice to expend power for external refrigeration at other points in the system, particularly during the liquefying where, as pointed out, only a minimum temperature drop is required. In contradistinction we apply our external refrigeration at the point where a maximum drop in temperature with a minimum abstraction of heat is required and where heat leakage into the system is most deleterious.

The system, therefore, considered in its entirety, is one which lends itself to increase in general and thermo-dynamic efficiency with the production of a high purity product of extremely high yield, with a minimum power consumption.

This application is a division of application filed Sept. 16, 1922, Serial No. 588,530.

We claim:

1. A liquefying apparatus comprising, in combination, interchangers for cooling the gaseous mixture, a substantially horizontally disposed liquefier for the liquefaction of the major portion of the undesired constituents of the gas, appropriate connections between the interchangers and the liquefier, a chamber communicating with the liquefier and receiving the vapor and condensate discharged from the liquefier for separation, means whereby the condensate is utilized in counter-flow in the liquefier and interchangers, a purifier to which the uncondensed vapor is led from said chamber, a connection for so leading said vapor, and an external cycle of refrigeration for the purifier.

2. A liquefying apparatus comprising, in combination, interchangers for cooling the gas, a substantially horizontally disposed liquefier for the liquefaction of the major portion of the undesired constitutents of the gas, appropriate connections between the interchangers and the liquefier, a chamber communicating with said liquefier, said chamber receiving the vapor and condensate discharge from the liquefier for separation, a purifier to which the uncondensed vapor in said chamber is led, a connection from the chamber to the purifier for so leading such vapor, an external cycle of refrigeration for the purifier, and means for utilizing substantially all the liquid condensed in the liquefier and purifier in counter-flow in the liquefier and interchangers.

In testimony whereof, we have hereunto signed our names.

RICHARD C. TOLMAN.
WILLIAM L. DE BAUFRE.
JOHN W. DAVIS.
MONTAGUE H. ROBERTS.